Figure 1:
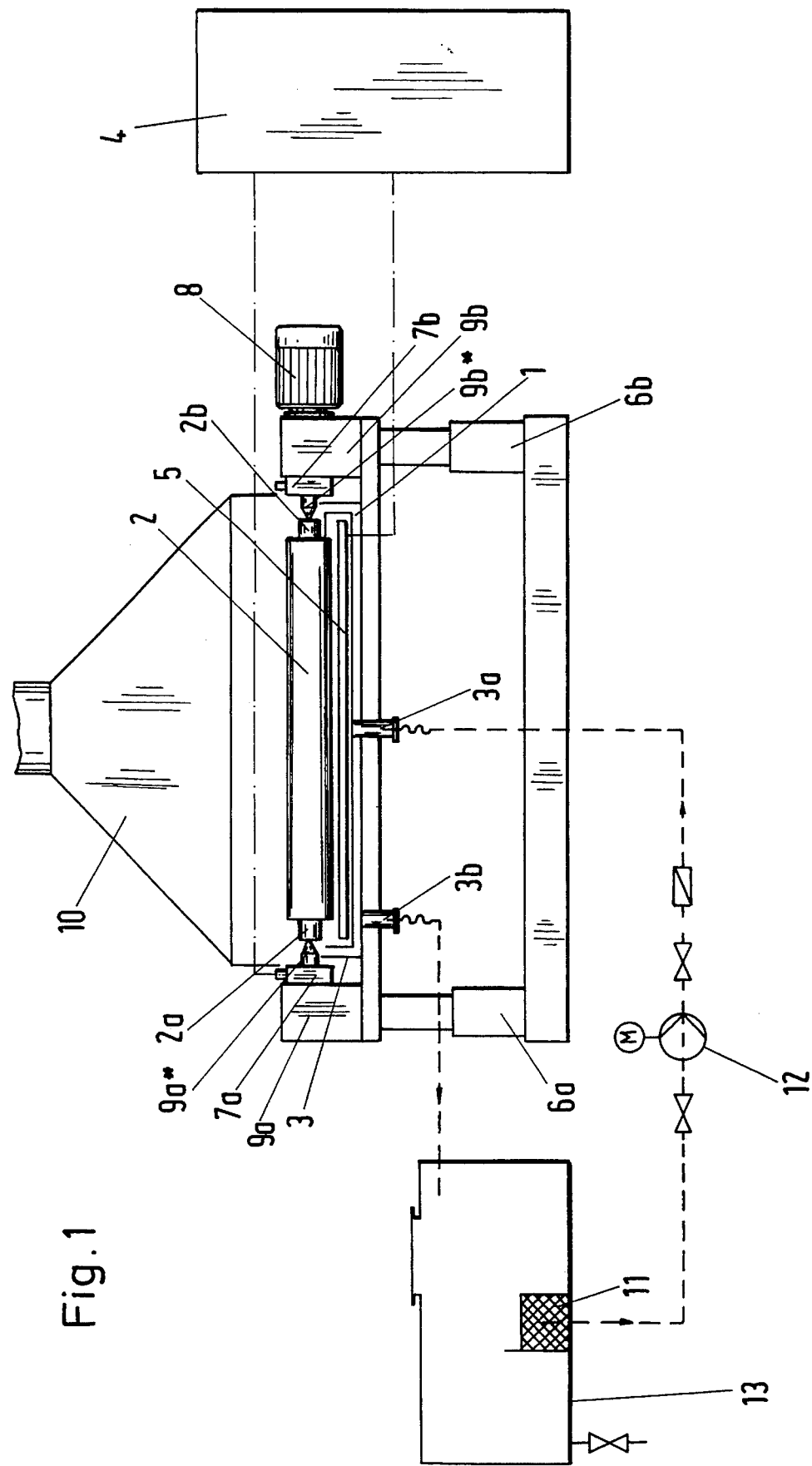

United States Patent [19]

Dejneko et al.

[11] Patent Number: 5,484,513

[45] Date of Patent: Jan. 16, 1996

[54] PROCESS AND APPARATUS FOR PRODUCING A ROUGH GENERATED SURFACE ON A CYLINDRICAL BODY OF ROTATION

[75] Inventors: Andrej D. Dejneko; Wladimir N. Skorochodov, both of Moskau; Sergej L. Kozar; Wladilen S. Lepekin, both of Lipezk; Wladimir P. Schumilow, Moskau, all of U.S.S.R.; Mihail-Dan Gutu; Udo Riedesel, both of Hemer, Germany; Heinz F. Rogowsky, Dortmund, Germany

[73] Assignee: Sundwiger Eisenhutte Maschinenfabrik GmbH & Co., Heger, Germany

[21] Appl. No.: 189,960

[22] Filed: Feb. 1, 1994

[30]    Foreign Application Priority Data

Feb. 5, 1993 [DE] Germany .................... 43 03 447.0

[51] Int. Cl.⁶ .................. C25F 3/02; C25F 7/00
[52] U.S. Cl. .................. 204/129.1; 204/129.95; 204/212; 204/224 M

[58] Field of Search ................. 205/143, 151, 205/134; 204/212, 129.1, 129.95, 224 M

[56]          References Cited

U.S. PATENT DOCUMENTS

| 1,918,627 | 7/1933 | Ballard .......................... 205/151 X |
| 2,272,609 | 2/1942 | Kennedy et al. ................ 205/134 X |
| 3,519,548 | 7/1970 | Karlquist ...................... 205/143 X |
| 3,647,646 | 3/1972 | Tucker et al. .................. 205/143 |
| 5,344,538 | 9/1994 | Chamberlain et al. ............ 204/212 |

*Primary Examiner*—Donald R. Valentine
*Attorney, Agent, or Firm*—Meltzer, Lippe, Goldstein et al.

[57]             ABSTRACT

The invention relates to a process and apparatus for producing a rough and hard generated surface on a cylindrical body of rotation, more particularly a roll for metal strips. To rapidly obtain as uniform a surface roughness as possible, the body of rotation (2), acting as a cathode, is immersed over its whole length into an electrolyte (1) in a tank (3) only to such an extent that the immersed peripheral portion is narrower by a multiple than a plate-shaped anode (5) disposed opposite the body of rotation and extending over its whole length. The electrolyte can contain a substance suitable as a finishing deposit on the generated surface.

13 Claims, 2 Drawing Sheets

PROCESS AND APPARATUS FOR PRODUCING A ROUGH GENERATED SURFACE ON A CYLINDRICAL BODY OF ROTATION

To obtain metal strips suitable for special applications, such as bodywork for motor vehicles or shadow masks, the metal strips are rolled with rolls which have a rough (textured) generated surface. In the prior art such generated surfaces can be obtained in various ways:

1. The surface is sprayed with fine-grained solids.
2. Electroerosive processing by the pulsed discharge of electrodes.
3. Pulsed irradiation with focused laser beams.
4. With electron beam guns.

All these processes share the feature that the processing surface of the different means usea for roughening is very small, for the treatment of the whole generated surface, therefore, the treatment surface must be moved along a spiral line by a combination of axial and rotary movements between the processing means and the roll. This way of producing a rough generated surface is very time-wasting, even if a number of processing means operate in parallel.

In addition to roughness, a hard surface is also frequently required. To meet this further demand, in the prior art processes after the rough surface has been produced, the roller must be subjected to a further treatment by which a wear-resistant hard layer is applied to the surface.

It is an object of the invention to provide a process and an apparatus by means of which roughness can be produced rapidly and uniformly over the whole surface.

This problem is solved according to the invention by the features that the body of rotation, immersed over its whole length in the bath of an electrolyte and acting as a cathode, is rotated around its axis opposite a plate-shaped anode extending longitudinally in relation to the cathode, while the body of rotation is immersed in the bath of the electrolyte only by a peripheral portion which is a fractional part of the width of the plate-shaped anode.

Due to the "focusing" of the electric field, in the process according to the invention electric discharges which uniformly roughen the generated surface in a controlled manner take place continuously and uniformly via the electrolyte and an interposed hydrogen layer (dielectric) between the large-area plate and the small-area peripheral portion. Uniform roughness is produced over the whole generated surface due to the continuous rotary movement of the body of rotation. The process according to the invention also ensures high reproducibility, with a wide spectrum of adjustability of surface texture. Starting from roughnesses between 0.2 and 0.5 μm Ra, within a very short time final roughnesses of between 0.7 and 0.5 μm Ra can be obtained, with a distance between the roughness tips $S_m$ of 40–160 μm.

The roughening of the generated surface of the body of rotation can be combined with the application of a metallic coating, if the electrolyte contains a substance suitable for this purpose. The electrolyte can contain as a suitable substance 5–20% $Cr(NO_3)_3 \times 9H_2O$. By the deposition of the resulting chromium layer an intermetallic chromium bonding is obtained, which gives the body of rotation a high resistance to wear. Hardnesses of at least HV 1.200 can be obtained in a problem-free manner by the process according to the invention.

Of course it has been known for many years to copper-plate and chromium plate rollers, more particularly printing rollers, by immersing the rollers over their whole length in a both of an electrolyte and rotating them around their own axis therein, a rod-shaped electrode extending over the whole length of the roller being associated with the electrolyte (DE 41 13 361 A1), but the sole object of that process is to apply copper or chromium and not also to roughen the surface in a controlled manner. Moreover, due to the rod-shaped anode controlled roughening is impossible using such a process hence, unlike the invention, in that process the field is not focused on the roll, but diverges.

A number of process parameters have proved to be advantageous for the process according to the invention. For example, the width ratio between the peripheral portion of the body of rotation and the plate-shaped anode should be between 1:4 to 1:8. The treatment temperature should be between 35° and 65° C., the peripheral velocity of the generated surface between 0.03 and 0.3 m/min., the specific current density between the cathode and the anode 30–100 $A/dm^2$, and the applied voltage between 200 and 300 V.

If desired, patterns can also be produced on the generated surface by holding a screen having a suitable pattern in front of said surface.

The invention also relates to an apparatus for the performance of the process, which is characterized by: a tank for an electrolyte; a carrier which has a rotary drive for the body of rotation and which retains the body of rotation over the tank and is devised for an adjustable depth of immersion of the body of rotation; a current supply to the generated surface, acting as a cathode, of the body of rotation; and a plate-shaped anode which is disposed in the tank and extends along the body of rotation and is connected to the current source and which is three to ten, more particularly four to eight times as wide as the immersed peripheral portion of the body of rotation disposed opposite the anode.

Figure 2:
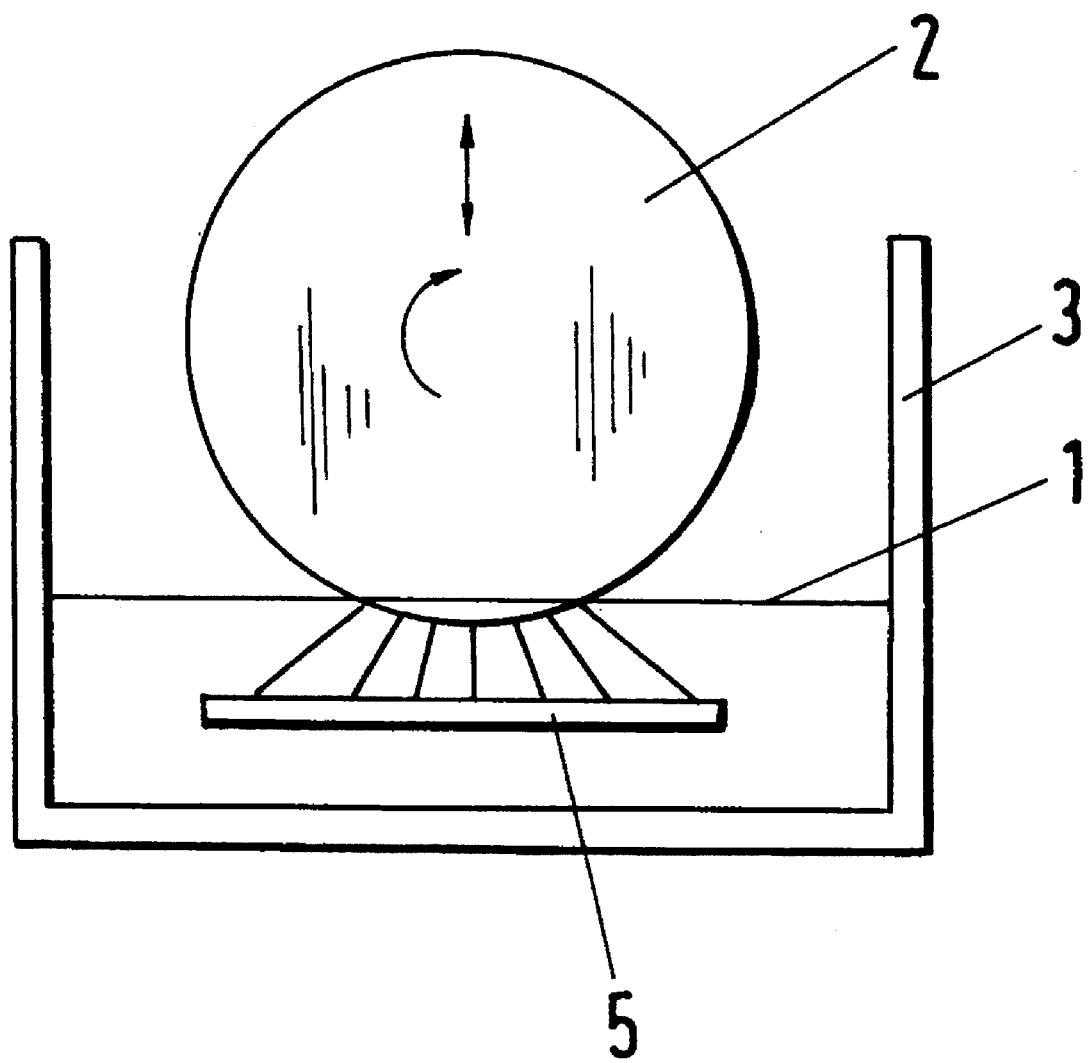

An embodiment of the invention will now be explained in greater detail with reference to the drawings, wherein:

FIG. 1 is a diagrammatic view of an apparatus for roughening the generated surface of a cylindrical body of rotation, and FIG. 2 is a side elevation of the body of rotation acting as a cathode, with an oppositely disposed plate-shaped anode.

A tank 3 is filled with an aqueous electrolyte 1 which has as a substance for depositing a proportion of 5–20% $Cr(NO_3)_3 \times 9H_2O$. The tank 3 contains an anode 5 taking the form of a plate extending over the whole length. The body of rotation 2 constructed in the form of a cylindrical roll is immersed in the electrolyte 1 over its whole length, but only by a portion of its periphery which is substantially smaller than the plate is wide. The ratio between the peripheral portion and the plate width should be 1:3 to 1:10, preferably 1:4 to 1:8.

At its and face bearing pins 2a, 2b the body of rotation 2 is clamped between tips 9a*, 9b* of bearing members 9a, 9b. The plate-shaped anode 5 is connected to a current source 4, directly, the body of rotation 2, acting as a cathode, being connected thereto via the tips 9a*, 9b* and current supply lines 7a, 7b.

The body of rotation 2 is driven by a variable-speed d.c. motor 8 via the tip 9b*. The bearing members 9a, 9b are borne by adjusting elements 6a, 6b, to enable the depth of immersion of the body of rotation 2 into the electrolyte to be adjusted. Alternatively it is possible to adjust the depth of immersion of the body of rotation 2 in the electrolyte by vertical adjustment of the tank 3. A hood 10 is disposed above the tank 3.

The tank 3 has an inlet 3a and an outlet 3b via which the electrolyte 1 is circulated by means of a pump 12 via a collecting tank 13 with incorporated filter 11.

Due to the selected width ratios of the peripheral portion of the generated surface of the body of rotation 2 immersed in the electrolyte and of the plate 5, the electric field focussed on the peripheral portion is formed which is shown in FIG. 2, so that discharges take place distributed uniformly over the surface, which produce the required surface roughness.

We claim:

1. A process for producing a rough generated surface on a cylindrical body of rotation, comprising immersing said body along its entire length into a tank containing an electrolyte and a plate-shaped anode extending longitudinally relative to said body so that only a peripheral portion of said body is immersed in said tank, said peripheral portion being a fractional part of the width of said plate-shaped anode, with said body acting as a cathode, causing an electric current to pass through said tank so that electrical discharges are focused on said peripheral portion of said body thereby to roughen it, and rotating said body in said tank.

2. The process according to claim 1, further comprising performing said process with an adjustable depth of immersion.

3. The process according to claim 2, wherein said electrolyte comprises a substance which is suitable as a deposit on the generated surface of the body of rotation.

4. The process according to claim 3, wherein said substance comprises a proportion of 5 to 20% $Cr(NO_3)_3 \times 9H_2O$.

5. The process according to claim 1, further comprising performing said process at a temperature between 35° and 65° C.

6. The process according to claim 1, further comprising performing said process at a peripheral velocity of the generated surface of the body of rotation of 0.03 - to 0.3 m/min.

7. A process according to claim 1, further comprising performing said process with a specific current density between said cathode and said anode of 30 to 100 $A/dm^2$.

8. The process according to claim 1, further comprising performing said process with an applied voltage of 200 to 300 V.

9. The process according to claim 1, further comprising performing said process by using a patterned screen retained by the generated surface of the body of rotation.

10. The process of claim 1, wherein said body of rotation comprises a roll for metal strips.

11. Apparatus for producing a rough generated surface on a cylindrical body of rotation, comprising a tank adapted to containing an electrolyte to contain bath a plate-shaped anode adapted to be disposed in said bath, a current source connected to said anode and to said body, a carrier which is adapted to support said body for immersion of a peripheral portion of said body into said bath opposite said plate-shaped anode, the depth of immersion being adjusted so that the width of said plate-shaped anode is three to ten times as wide as the peripheral portion, and the carrier including a rotary drive for rotating said body in said bath, the current supplied by said current source being such that with said body acting as a cathode, electrical discharges are focussed on said peripheral portion of said body thereby to roughen it.

12. The apparatus according to claim 11, wherein said anode is four to eight times as wide as said immersed peripheral portion of the body rotation disposed opposite said anode.

13. The apparatus of claim 11, wherein said body of rotation comprises a roll for metal strips.

* * * * *